INVENTOR.
Austin A. Armer
BY
Flehr and Swain
Attorneys

INVENTOR.
Austin A. Armer

INVENTOR.
Austin A. Armer

Aug. 22, 1961 A. A. ARMER 2,997,086
BEET SCREENING AND CLEANING DEVICE
Filed Nov. 6, 1958 6 Sheets-Sheet 4

INVENTOR.
Austin A. Armer
BY
Attorneys

Aug. 22, 1961 A. A. ARMER 2,997,086
BEET SCREENING AND CLEANING DEVICE
Filed Nov. 6, 1958 6 Sheets-Sheet 5

INVENTOR.
Austin A. Armer
BY
Attorneys

Aug. 22, 1961  A. A. ARMER  2,997,086
BEET SCREENING AND CLEANING DEVICE
Filed Nov. 6, 1958  6 Sheets-Sheet 6

INVENTOR.
Austin A. Armer
BY
Attorneys

United States Patent Office 2,997,086
Patented Aug. 22, 1961

2,997,086
BEET SCREENING AND CLEANING DEVICE
Austin A. Armer, Davis, Calif., assignor to Spreckels Sugar Company, San Francisco, Calif., a corporation of California
Filed Nov. 6, 1958, Ser. No. 772,304
15 Claims. (Cl. 146—85)

This invention relates generally to systems for the receiving, cleaning and screening of vegetable roots, and is particularly applicable to the cleaning and screening of sugar beets.

In the preparation of sugar beets for the manufacture of sugar, the plants are first lifted from the ground, the leaves cut off and the roots hauled to the factory. Machinery has largely replaced the hand labor formerly required for these tasks with the result that large amounts of dirt and trash are generally delivered with the beets. It is essential that this dirt and trash be removed from the beets as completely as possible prior to introduction of the beets into the sugar mill. Moreover, it is essential that such removal be quickly and effectively accomplished, especially during the processing season, if the continuous flow of beets so essential to efficient processing is to be maintained.

The most consistent cause of interruptions is the delivery of excessively dirty beets. By way of illustration, machine harvested beets are frequently mixed with large amounts of dirt and mud, interlaced with weeds, grass, leaves and the unwanted stems and tips of the beets themselves. Systems presently used for receiving and cleaning the beets can be bridged or become choked with excessive accumulations of dirt and trash, and cease to function properly. The inevitable delays which result are disturbing not only to the beet sugar manufacturer but also to the growers interested in an orderly harvest and disposal of the beet crop.

It will be evident from the foregoing that a cleaning and screening machine for carrying out effective beet receiving operations presents a difficult problem, particularly in that the successful separation of the beet roots from dirt, leaves, stems, etc., requires a certain selectivity of operation.

It is an object of the present invention to provide a machine suitable for beet receiving that is highly effective in the cleaning and screening of beets, and which also is selective in its operation.

A further object of the invention is to provide a machine of the above character which can be used continuously and which is capable of operating effectively under extremely severe conditions, as during the harvesting season.

Another object of the invention is to provide an improved machine of the above character which is not unduly complicated in mechanical construction and which is applicable to present day beet receiving methods.

Additional objects of the invention will appear from the following description in which the preferred embodiments of the invention have been set forth in detail in conjunction with the accompanying drawing:

Referring to the drawing.

Figures 11, 12:
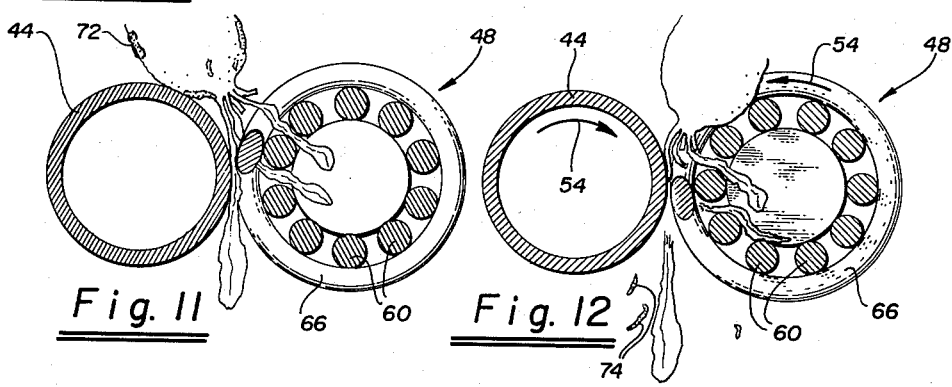

FIGURES 11 and 12 similarly illustrate the construction and operation of the root screening means.

FIGURES 13 to 16 are cross sectional views of modified forms of the impact roll means.

Figure 17:
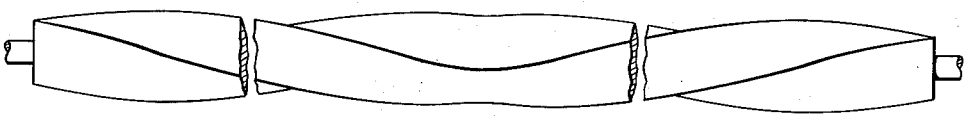
Figure 18:

FIGURES 17 and 18 are side and end elevational views respectively of a further modification of an impact roll means.

Figure 19:
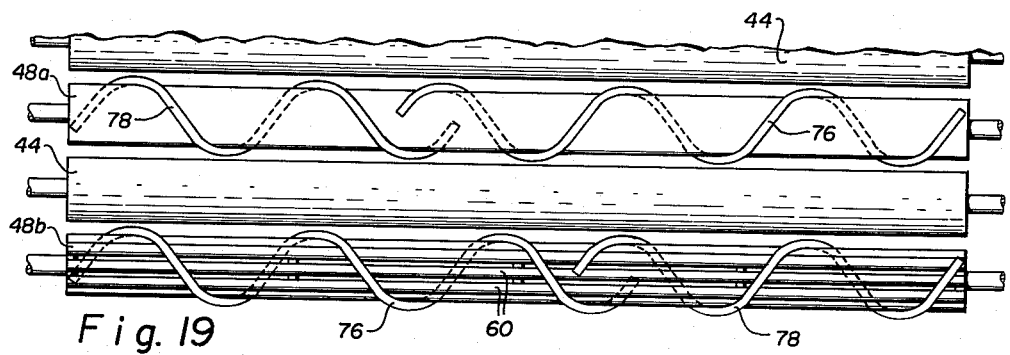

FIGURE 19 is a view in top plan of a modified form of root screening means.

Figure 1:
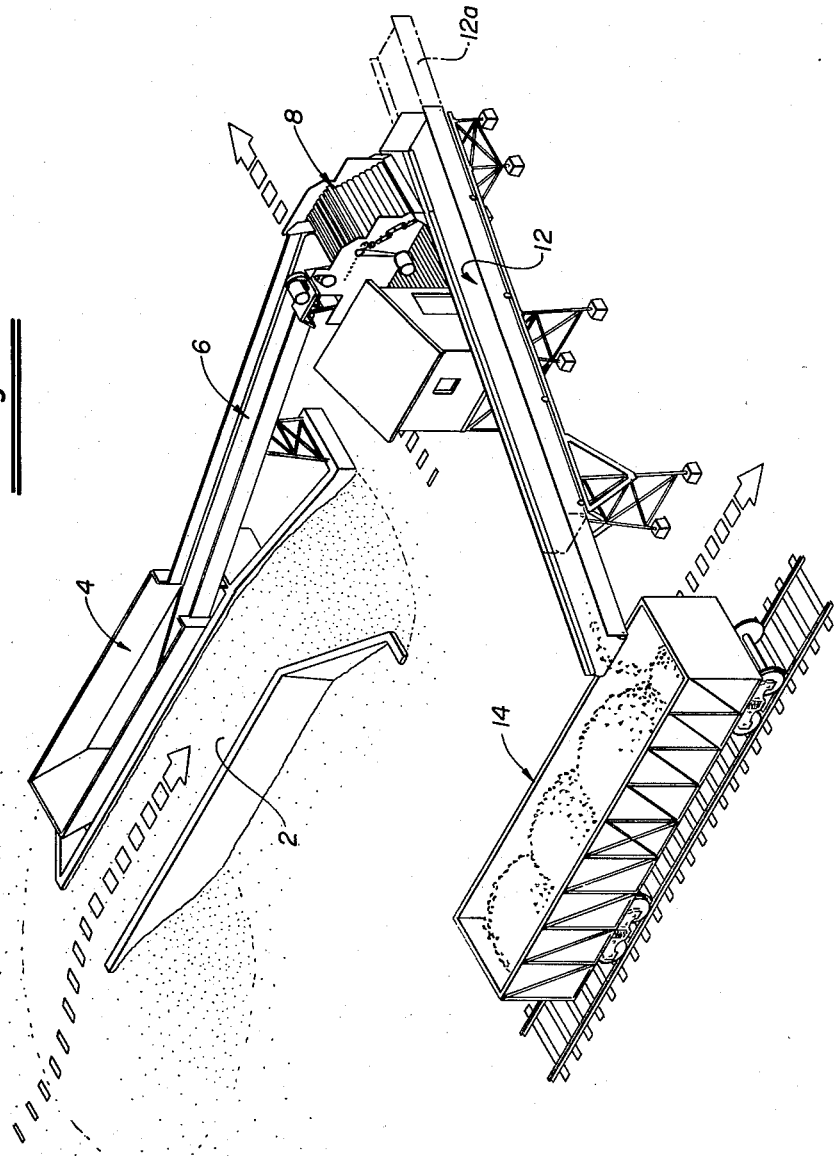
FIGURE 1 is a view in perspective of a beet receiving, cleaning and screening system embodying the invention.

FIGURE 1 illustrates a processor's receiving station adapted to receive sugar beets or other vegetable roots by the truckload. Such receiving stations can be on the factory premises, but in most cases are located adjacent to railroad sidings within the root harvesting area. As illustrated, the receiving station consists of a truck ramp 2 positioned adjacent a receiving hopper 4 into which the beets are dumped. An elevating conveyor 6 carries the beets from the hopper to the cleaning and screening mechanism at 8. Unwanted dirt and trash falling through this mechanism are removed by a conveyor 10 (FIGURE 4) and delivered to dirt trucks passing beneath the conveyor. Clean beets are delivered from the mechanism at 8 to an auxiliary conveyor 12 for discharge either to railroad cars 14, to trucks, barges, or to factory storage bins. Desirably, the conveyor 12 is retractable to accommodate various types of transport vehicles, as indicated by the dotted lines at 12a.

Figure 2:
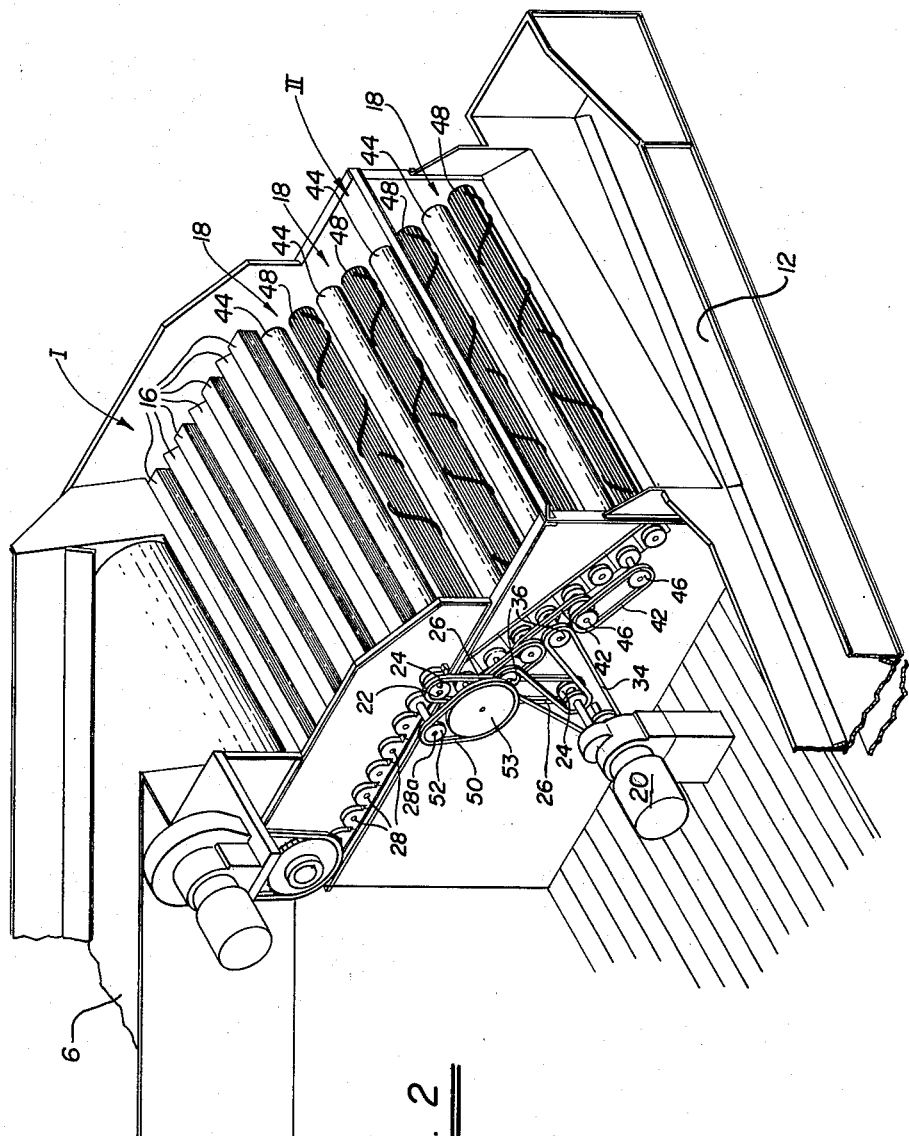
FIGURE 2 is an enlarged perspective view showing details of the machinery employed for cleaning and screening the beets as used in the system of FIGURE 1.
Figure 3:
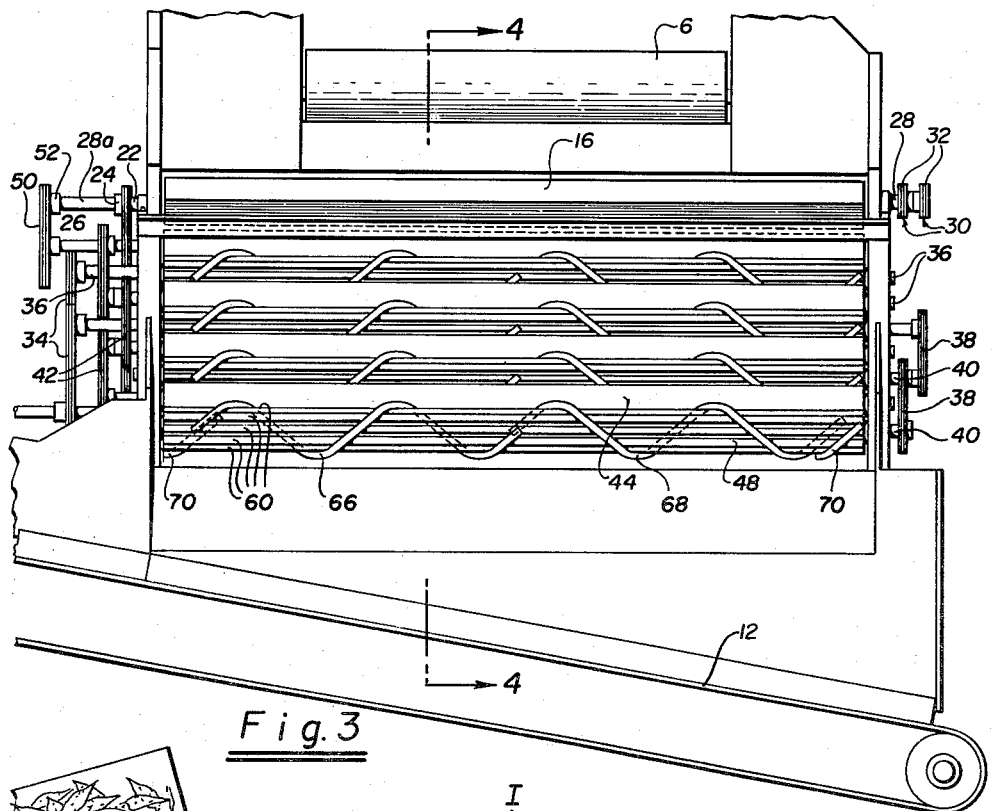
FIGURE 3 is a view in front elevation thereof.
Figure 4:
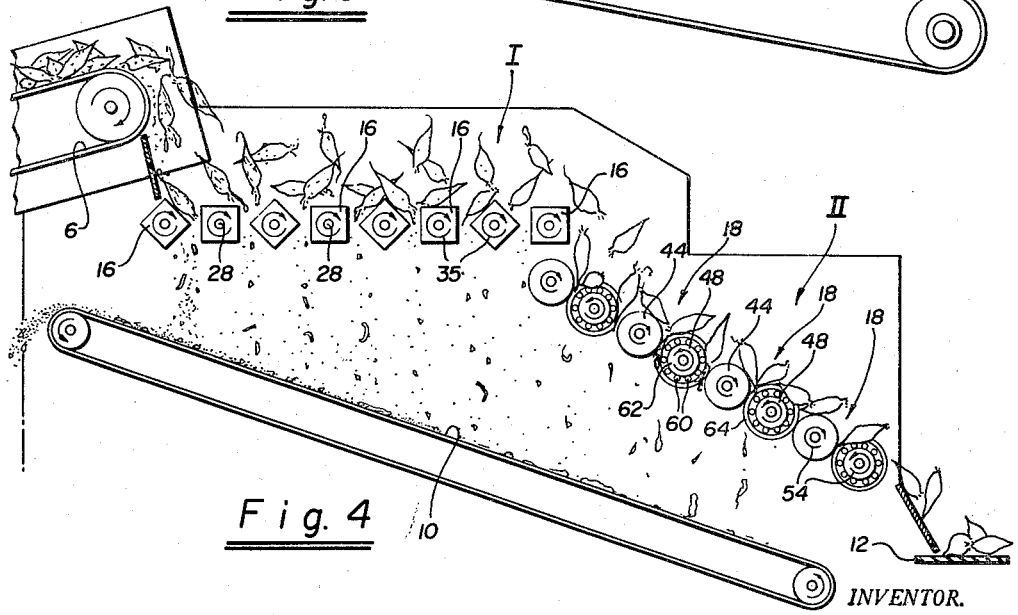
FIGURE 4 is a view in vertical section along the line 4—4 of FIGURE 3.

Broadly considered, the present invention is directed to an improved method and apparatus for separating the beets or other vegetable roots from an intermixture of dirt, mud, weeds, trash, beet tops, rocks and other contaminants normally adhering to the root complex. As represented in FIGURES 2 to 4, such apparatus includes a plurality of horizontally arranged rotors 16 of substantially polygonal cross section which form an impacting zone at I, and a plurality of pairs of substantially cylindrical rolls 18 arranged in a single plane inclined downwardly from the plane of the impacting rotors and which form a screening zone at II. Each of the rotors 16 and rolls 18 is arranged transverse to the direction of beet flow and all have their axes in substantial parallelism.

The impacting rotors 16 all rotate in the same direction (clockwise as viewed in FIGURE 4) and function to advance and simultaneously to violently agitate or bounce the beets by repeated impacts of the corners or edges of the rotors. As a result, dried clods of dirt which normally adhere to the beets undergo constant impact and attrition, with the result that the broken particles are removed by falling downward through the spaces between the rotors. In contrast, the pairs of screening rolls 18 include smooth and flighted rolls 44 and 48 adapted to be rotated in opposite directions so that stems, weeds, trash, and similar foreign materials will be vigorously nipped between the rolls and forcibly screened from the descending beets. To insure a minimum of clogging of these rolls, the flighted rolls preferably rotate upwardly against beet flow and the smooth rolls downwardly in the direction of beet flow. The pairs of screening rolls 18 can be of the type described in Armer 2,604,206, or they can be of alternate construction, as will appear.

As specifically shown in FIGURES 2 and 3, rotation of the various roll means can be accomplished by a suitable motor 20, linked to the spindles by a conventional chain and sprocket assembly. Thus the polygonal impact rotors 16 can be driven by the power transmission spindle 22 linked to the motor by means of the sprockets 24 and chain 26, with the remaining spindles 28 receiving drive transmission from the sprockets 30 and chains 32 positioned on the opposite side of the mechanism (FIGURE 3). The chains 32 can be linked for a progressive roll-to-roll take-off to insure that all the rolls 16 will rotate in the same direction. In like manner, power can be supplied to the flighted screening rolls 48 by means of the chain 34 linked to the pair of stub shafts 36

(FIGURE 2), with the remaining rolls 48 being driven by the auxiliary chains 38 and stub shafts 40 located on the opposite side (FIGURE 3). As illustrated in FIGURE 2, the smooth rolls 44 are all rotated in the same downward or clockwise direction by means of the sprockets 46 and the chains 42, which are driven by the power take-off shaft 28a, chain 50, and speed reducing sprockets 52 and 53. It will be understood that this arrangement causes a counterclockwise or upward rotation of the rolls 48 against the flow of beets, and opposed to the rotation of the smooth rolls 44. This relationship is represented by the arrows 54 (FIGURE 4).

Generally, as indicated in FIGURE 4, the beets delivered from the conveyor 6 fall onto the series of rotating rotors 16 where they are violently bounced or agitated for a period of time depending to some extent on the rate of rotation of the rotors 16 and also upon the particular shape of the rotors. Preferably the rotors 16 are of such dimension, with relation to the spacing of the supporting shafts 38, that the maximum space possible between adjacent rolls is no greater than about one-third the face dimension of an individual rotor. Thus, in the case of a square rotor having a face four and one-half inches in width, the spacing should be no greater than about one and one-half inch (optimum about one inch). Such spacing will permit the passage of most foreign matter, including rocks and undesired beet fragments, but will not permit the passage of marketable sugar beet roots. In no event should the spacing be such that the rotors can contact one another. Also, I have found that best results are obtained when the minimum cross sectional dimension of an impacting rotor is at least as great as the mean diameter of the beets undergoing treatment. Each of the above relationships is important in insuring that a proper advance and agitation of the beets is obtained.

Figure 5:
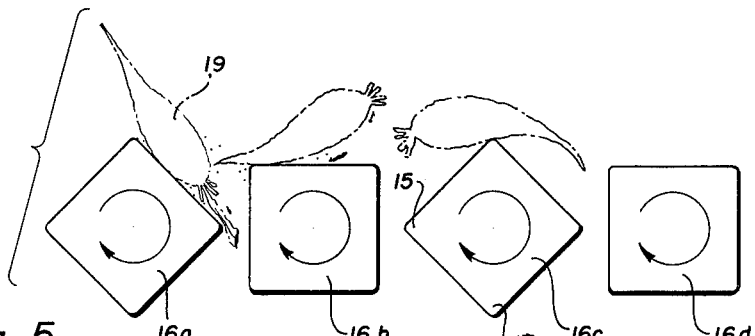
FIGURES 5 to 10 illustrate schematically, and in sequence, the operation of the root impacting means.
Figure 6:
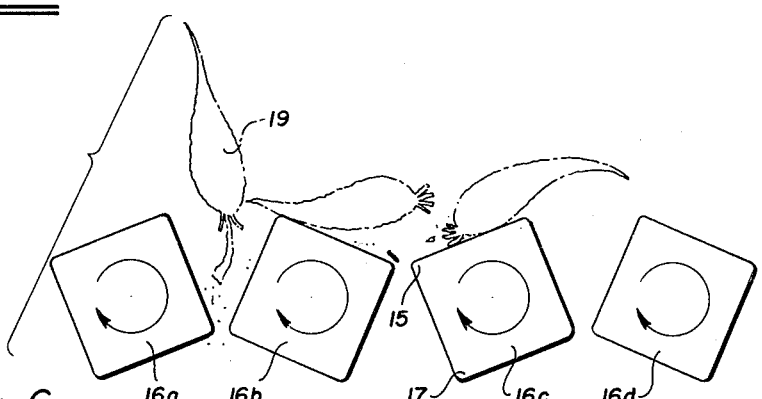
Figure 7:
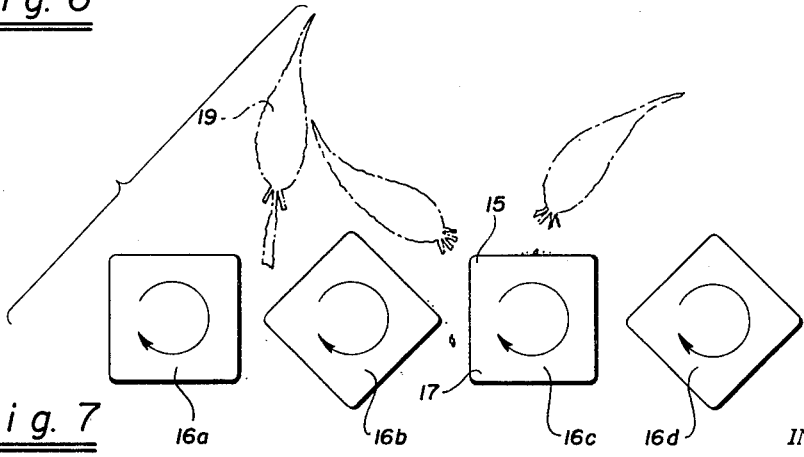
Figure 8:
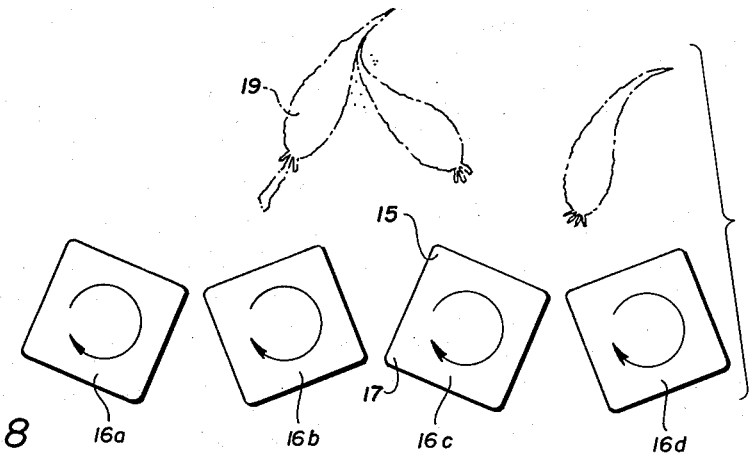
Figure 9:
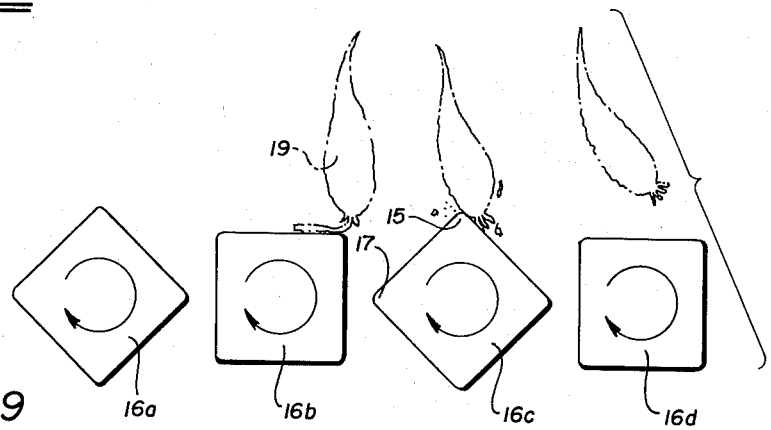
Figure 10:
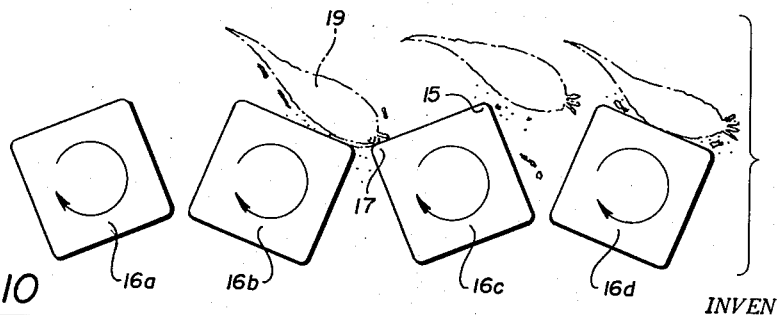
Figure 13:
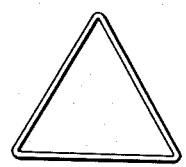
Figure 14:
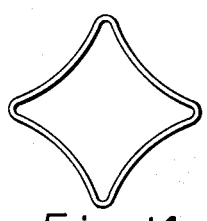
Figure 15:
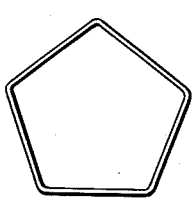
Figure 16:
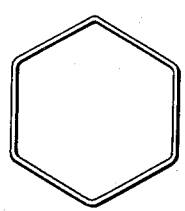

As previously mentioned, effective separation of undesired contaminants in the impacting zone is largely dependent on a proper rotational speed of the impacting rotors 16. Desirably the speed of rotation should be such that enlarging of the space between adjacent rotors, say to a distance greater than about one inch, will not permit the falling-through of any beets larger than one inch in diameter. In other words, the upward impulses provided by the corners of the rotors passing through the gap should occur with greater frequency than the time required for gravity to accelerate the beets downwardly one-half the circumscribed diameter of the rotor. This relationship is illustrated schematically in FIGURES 5 to 10 where the elapsed time between the upward impulses provided by the corners 15 and 17 of the third rotor 16c is less than the time required for the beet 19 to fall from the uppermost position of FIGURE 7 to its final position of impact in FIGURE 10. FIGURES 5 and 10 are also of interest in that they illustrate the repeated impacting and bouncing of the beets against the rotors and against themselves to shake loose the clods of dirt and caked mud adhering to the beets. These views further illustrate the manner of advancing the beets, from rotor to rotor, in the common direction of rotation. In general, I have found that the novel results just described can be obtained by a rotational speed of rotors 16 within the range from about 80 to 180 r.p.m. and regardless of the particular angular disposition of one rotor with respect to its neighbor. Also I have found that improved performance can sometimes be obtained by rotation of the rotors at a progressively increasing rate of speed, in the direction of beet flow, although rotation at the same rate of speed is generally to be preferred.

It is desirable that the rotors 16 be designed to prevent unnecessary slicing or fracture of the beets, as they are advanced in the impacting zone. Specifically, the corners of the rotors can be slightly rounded as shown in FIGURES 5 to 10 or in FIGURES 13 to 16. The corners can also be constructed with separate longitudinally extending inserts, for example, of wood, hard rubber, or other resilient material, firmly secured to the rotor structure. It will be understood that such construction tends to minimize injury to the beets.

Referring again to FIGURE 4, partially cleaned beets are continuously delivered from the impacting zone at I to the screening zone at II provided by the pairs of cylindrical rollers 18. In the principal embodiment of the apparatus (FIGURES 2 to 4) each pair 18 of the cylindrical roll means includes a smooth cylindrical roll 44 and a flighted cage roll 48. The latter comprises a series of longitudinally extending bars 60 equally spaced about the supporting end and intermediate disks 62, and carrying helically wound flights 66 and 68. The arrangement of these flights is such that beets deposited adjacent the center of the roll means are spread outwardly towards the ends. Preferably small return flights 70 are also provided to prevent an excess accumulation of beets and foreign matter adjacent the side boards at the ends of the rolls. In general, the flighted rolls 44 are rotated at a much faster rate than the smooth rolls 48 to thereby provide a combination rolling, shearing action. Thus I prefer to rotate the flighted rolls within a range between about 100 and 200 r.p.m., and the smooth rolls within the range from about 5 to 50 r.p.m.

The function of the cylindrical screening rolls is to "nip" protruding stems and root segments from the beets along with weeds, grass and other trash, and also to flake wet, plastic mud from the surface of the beets. These results, illustrated in FIGURES 11 and 12, are produced by a close proximity of the flights 66, 68 to the surface of the smooth rolls 44, and also by the rotation of adjacent rolls in a pair in opposite directions and at different speeds. As shown in FIGURE 11, the protruding stems, roots, grass, etc. are caught within the open framework of the cage roll 48, and upon subsequent rotation of the flights 66 and 68 against the surface of the smooth roll 44, are nipped and broken away from the body of the beet. Similarly, layers of wet mud, as represented at 72 in FIGURE 11, are flaked from the surface of the beet, much as in conventional calendering operations, and subsequently fall from the surface of the smooth roll as indicated at 74 in FIGURE 12. The net result is an effective removal of weeds, stems, mud and the like from the surface of the beets.

So far the description has related to a preferred embodiment of the cleaning and screening apparatus, as particularly illustrated in FIGURES 1–12. However, other and widely differing embodiments and constructions can be employed with equal success. For example, the impacting rotors 16 need not be square in cross section, but can take other forms as suggested in FIGURES 13 to 16. The essential requirement is that the cross sectional configuration provide for repeated upward impulses or "impacts" within the pattern of operation heretofore described. The longitudinal configuration of the impact rolls might also be varied, for example as in FIGURES 17 and 18, to provide for a lateral spreading (or concentration) of the beets in the impact zone. Similarly, FIGURE 19 suggests a possible change in the construction and arrangement of the screening rolls 44, 48 wherein an alternating series of flighted cylindrical and flighted cage rolls is employed. FIGURE 19 also suggests that the spreading function could be achieved by an alternating arrangement of long and short helical flights 76 and 78, as illustrated. Those skilled in this art no doubt will think of many additional changes in construction or applications of the invention, without departing from the spirit and scope thereof.

The operation of the cleaning and screening apparatus can be summarized as follows:

The beets from the conveyor 6 are received at the left hand end of the apparatus (FIGURES 2 and 4) and fall into the impacting zone I created by the rotors 16. There the beets are bounced and agitated in a violent manner while being carried forward by the rotary action of the rotors. This action causes caked mud and clods of dirt to be rapidly shattered and reduced in size so that most of the dirt falls between the rotors and is removed by the conveyor 10. The beets falling from the rotors 16 are immediately subjected to the selective screening provided in the zone II by the pairs 18 of cylindrical roll means. These rolls rotating at different speeds and in different directions subject the surface of the beets to a vigorous nipping and shearing action which screens leaves, weeds, grass, mud and other foreign material from the surface of the beets. Substantially clean beets are then discharged from the apparatus to the belt 12, and are delivered to suitable carriers 14 for transport to the beet processor. The cleaning and screening thus accomplished is very efficient and produces a very fast through-rate of the beets through the appartus.

By way of example, an existing commercial machine having an overall length of about ten feet, and employing rolls about ten feet in length, is able to separate dirt and stones, and screen stems, weeds, and other trash from the beets, on a very high capacity continuous basis, at a through-rate in excess of about 450 tons per hour. Such a machine employs square rotors having a face dimension of about five and one-half inches and mounted on spindles spaced about seven inches apart. These square rolls are rotated at about 190 r.p.m. The smooth and cage rolls have an average maximum diameter of about seven and eight inches, respectively, and rotate at 10 r.p.m. for the smooth rolls and 150 r.p.m. for the cage rolls. Cleaning and screening is quickly and effectively accomplished, with the beets being continuously accepted and processed even under most severe conditions without bridging or choking. The efficiency of operation is also quite high, with dirt removal being as high as 90% and product loss less than 1%.

I claim:

1. In a high capacity beet screening and cleaning device: a plurality of spaced impacting roll means arranged in parallelism and in a generally horizontal plane, said roll means being of substantially polygonal cross section and having at least three impact sides the intersections of said sides extending longitudinally of said rolls and said rolls being smooth and free of sharp projections, means positively rotating said roll means on their axes in the same direction and at a speed sufficient to advance the beets while preventing their passing between adjacent roll means, said speed being such that the peripheral velocity of said impacting rolls is of the order of about 160 to 380 f.p.m., said roll means being arranged transverse to the direction of beet flow, means for receiving beets from said roll means and for separating leaves, stems and other trash therefrom, said last named means likewise including roll means arranged transverse to the direction of beet flow, and means for conveying dirty beets to and clean beets away from such device.

2. A device as in claim 1 wherein the axes of said impacting roll means are spaced so that the maximum space possible between adjacent rolls in no greater than about one-third the face dimension of an individual roll means.

3. A device as in claim 1 wherein said receiving and separating means comprises a plurality of substantially cylindrical roll means arranged transverse to the direction of beet flow, including pairs of adjacent smooth and flighted roll means.

4. The device as in claim 3 wherein said plurality of cylindrical roll means are inclined downwardly away from said plurality of impacting roll means and are adapted to receive therefrom partially cleaned beets.

5. A device as in claim 3 wherein means are provided for rotating adjacent roll means in a pair of roll means in opposite directions to thereby provide a vigorous nipping action.

6. In a beet screening and cleaning device particularly adapted to the impact attrition and removal of dirt clods from sugar beets; a plurality of spaced impacting roll means arranged transverse to the direction of beet flow and having their axes in substantial parallelism, said roll means also being in substantially the same plane, each of said roll means being of regular polygonal cross section and having at least three impact sides, the intersections of said sides extending longitudinally of said rolls and said rolls being smooth and free of sharp projections, and means for rotating said roll means on their axes in the same direction and within a range of speeds sufficient to bounce and advance beets thereover without permitting individual beets to fall between adjacent roll means, said speed being such that the peripheral velocity of said impacting rolls is of the order of about 160–380 f.p.m., whereby an enhanced shattering and removal of dirt clods from the beets is obtained.

7. The device as in claim 6 wherein means are provided for rotating said roll means at a progressively increasing rate of speed, in the direction of beet flow.

8. The device of claim 6 wherein corners of said polygonal roll means are slightly rounded to reduce slicing or fracture of the beets in impact.

9. An improved beet screening and cleaning device comprising in combination: a first conveying means; a beet impacting means including a plurality of spaced impacting rolls arranged parallel to one another in a horizontal plane and transverse to the direction of beet flow, each of said roll means being of polygonal cross section and having at least three sides, and means rotating said roll means in a forward direction and within a range of speeds sufficient to advance beets without permitting individual beets to fall between the roll means; leaf and trash screening means including a plurality of pairs of cylindrical roll means arranged transverse to the direction of beet flow, all of said cylindrical roll means being in a single plane inclined downwardly from said impacting means, each of said pairs of cylindrical roll means including a smooth and a flighted roll, and means for rotating adjacent rolls in a pair of rolls in opposite directions; and a second conveying means for carrying clean beets away from the screening and cleaning operation.

10. A device as in claim 9 wherein said impacting roll means are substantially square in cross section.

11. A device as in claim 9 wherein each of said impacting roll means has an outward spiralling configuration for purposes of spreading beets outwardly from the center of the roll means.

12. A device as in claim 9 wherein said flighted cylindrical roll means include opposed spiral flights adapted to spread beets and foreign matter outwardly from the center portions of said roll means.

13. A device as in claim 12 wherein said flighted roll means are also provided with return flights to prevent an excessive concentration of beets near the ends of the roll means.

14. A device as in claim 12 wherein means are provided for rotating said smooth and flighted roll means at different speeds.

15. A device as in claim 14, including sprocket means adapted to rotate said flighted roll means at a faster rate than said smooth roll means.

References Cited in the file of this patent

UNITED STATES PATENTS

| | | |
|---|---|---|
| 81,980 | Burhaus | Sept. 8, 1868 |
| 925,691 | Freer | June 22, 1909 |
| 2,277,450 | Parr | Mar. 24, 1942 |
| 2,406,976 | Walz et al. | Sept. 3, 1946 |
| 2,604,206 | Armer | July 22, 1952 |

FOREIGN PATENTS

| | | |
|---|---|---|
| 97,418 | Germany | June 6, 1898 |